(12) United States Patent
Sauer et al.

(10) Patent No.: US 7,590,354 B2
(45) Date of Patent: Sep. 15, 2009

(54) REDUNDANT TRANSPONDER ARRAY FOR A RADIO-OVER-FIBER OPTICAL FIBER CABLE

(75) Inventors: Michael Sauer, Corning, NY (US); Andrey Kobyakov, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 590 days.

(21) Appl. No.: 11/505,772

(22) Filed: Aug. 17, 2006

(65) Prior Publication Data
US 2007/0292137 A1 Dec. 20, 2007

Related U.S. Application Data

(63) Continuation-in-part of application No. 11/454,581, filed on Jun. 16, 2006.

(51) Int. Cl.
*H04B 10/00* (2006.01)
(52) U.S. Cl. ..................................... 398/115
(58) Field of Classification Search .......... 398/115–116
See application file for complete search history.

(56) References Cited

U.S. PATENT DOCUMENTS

| | | | |
|---|---|---|---|
| 4,365,865 A | 12/1982 | Stiles | |
| 4,867,527 A | 9/1989 | Dotti et al. | |
| 4,889,977 A | 12/1989 | Haydon | |
| 4,896,939 A | 1/1990 | O'Brien | 350/96.23 |
| 4,916,460 A | 4/1990 | Powell | 343/853 |
| 5,039,195 A | 8/1991 | Jenkins et al. | |
| 5,042,086 A | 8/1991 | Cole et al. | |
| 5,189,718 A | 2/1993 | Barrett et al. | |
| 5,189,719 A | 2/1993 | Coleman et al. | |
| 5,260,957 A | 11/1993 | Hakimi et al. | |
| 5,268,971 A | 12/1993 | Nilsson et al. | |
| 5,301,056 A | 4/1994 | O'Neill | 359/145 |
| 5,339,058 A | 8/1994 | Lique | |
| 5,339,184 A | 8/1994 | Tang | 359/124 |
| 5,377,035 A | 12/1994 | Wang et al. | |

(Continued)

FOREIGN PATENT DOCUMENTS

CA    2242707 A1    1/1999

(Continued)

OTHER PUBLICATIONS

A. J. Cooper, "Fibre/Radio" For the Provision of Cordless/Mobile Telephony Services in the Access Network, Electronics Letters, Nov. 22, 1990, vol. 26, pp. 2054-2056.

(Continued)

*Primary Examiner*—Quan-Zhen Wang
(74) *Attorney, Agent, or Firm*—C. Keith Montgomery

(57) ABSTRACT

A redundant transponder array for a radio-over-fiber (RoF) optical fiber cable is disclosed. The redundant transponder array includes two or more transponders having an antenna system. The antenna system has first and second antennas adapted to form first and second substantially co-located picocells when operated at respective first and second frequencies. The second antenna is adapted to form a picocell that extends into the adjacent picocell when operated at the first frequency. A transponder thus can serve as a backup transponder to a failed adjacent transponder by redirecting the first-frequency signal sent to the failed transponder to the second antenna of the adjacent transponder.

20 Claims, 7 Drawing Sheets

U.S. PATENT DOCUMENTS

| | | | |
|---|---|---|---|
| 5,400,391 A | 3/1995 | Emura et al. ............... 379/59 |
| 5,424,864 A | 6/1995 | Emura ...................... 359/173 |
| 5,444,564 A | 8/1995 | Newberg ................... 359/187 |
| 5,457,557 A | 10/1995 | Zarem et al. ............... 359/121 |
| 5,469,523 A | 11/1995 | Blew et al. |
| 5,543,000 A | 8/1996 | Lique |
| 5,557,698 A | 9/1996 | Gareis et al. |
| 5,598,288 A | 1/1997 | Collar |
| 5,627,879 A | 5/1997 | Russell et al. ............... 379/59 |
| 5,640,678 A | 6/1997 | Ishikawa et al. ........... 455/33.2 |
| 5,642,405 A * | 6/1997 | Fischer et al. ............... 455/444 |
| 5,644,622 A | 7/1997 | Russell et al. ............... 455/422 |
| 5,648,961 A | 7/1997 | Ebihara ...................... 370/282 |
| 5,651,081 A | 7/1997 | Blew et al. |
| 5,668,562 A | 9/1997 | Cutrer et al. |
| 5,677,974 A | 10/1997 | Elms et al. |
| 5,682,256 A | 10/1997 | Motley et al. ............... 359/117 |
| 5,703,602 A | 12/1997 | Casebolt |
| 5,818,619 A | 10/1998 | Medved et al. |
| 5,821,510 A | 10/1998 | Cohen et al. |
| 5,825,651 A | 10/1998 | Gupta et al. |
| 5,854,986 A | 12/1998 | Dorren et al. ............... 455/562 |
| 5,867,485 A | 2/1999 | Chambers et al. ........... 370/281 |
| 5,881,200 A | 3/1999 | Burt |
| 5,883,882 A | 3/1999 | Schwartz |
| 5,910,776 A | 6/1999 | Black |
| 5,913,003 A | 6/1999 | Arroyo et al. |
| 5,930,682 A | 7/1999 | Schwartz et al. |
| 5,936,754 A | 8/1999 | Ariyavisitakul et al. ..... 359/145 |
| 5,943,372 A | 8/1999 | Gans et al. |
| 5,946,622 A | 8/1999 | Bojeryd ...................... 455/444 |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. ............... 359/132 |
| 5,983,070 A | 11/1999 | Georges et al. |
| 6,005,884 A | 12/1999 | Cook et al. ................. 375/202 |
| 6,014,546 A | 1/2000 | Georges et al. |
| 6,016,426 A | 1/2000 | Bodell ........................ 455/422 |
| 6,127,917 A | 10/2000 | Tuttle ........................ 340/10.1 |
| 6,128,470 A | 10/2000 | Naidu et al. ................. 455/16 |
| 6,150,921 A | 11/2000 | Werb et al. .................. 340/10.1 |
| 6,157,810 A | 12/2000 | Georges et al. |
| 6,232,870 B1 | 5/2001 | Garber et al. |
| 6,236,789 B1 | 5/2001 | Fitz |
| 6,268,946 B1 | 7/2001 | Larkin et al. ............... 359/173 |
| 6,292,673 B1 | 9/2001 | Maeda et al. ............... 455/522 |
| 6,314,163 B1 | 11/2001 | Acampora |
| 6,323,980 B1 | 11/2001 | Bloom |
| 6,324,391 B1 | 11/2001 | Bodell ........................ 455/403 |
| 6,337,754 B1 | 1/2002 | Imajo ........................ 359/174 |
| 6,353,406 B1 | 3/2002 | Lanzl et al. ................. 342/118 |
| 6,353,600 B1 | 3/2002 | Schwartz et al. |
| 6,374,124 B1 | 4/2002 | Slabinski .................... 455/562 |
| 6,405,018 B1 | 6/2002 | Reudink et al. ............... 455/20 |
| 6,405,058 B2 | 6/2002 | Bobier ........................ 455/562 |
| 6,405,308 B1 | 6/2002 | Gupta et al. |
| 6,438,301 B1 | 8/2002 | Johnson et al. |
| 6,438,371 B1 | 8/2002 | Fujise et al. ............... 455/422 |
| 6,477,154 B1 | 11/2002 | Cheong et al. ............... 370/328 |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,525,855 B1 | 2/2003 | Westbrook et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,594,496 B2 | 7/2003 | Schwartz |
| 6,606,430 B2 | 8/2003 | Bartur et al. |
| 6,634,811 B1 | 10/2003 | Gertel et al. |
| 6,640,103 B1 | 10/2003 | Inman et al. ................. 455/446 |
| 6,643,437 B1 | 11/2003 | Park |
| 6,652,158 B2 | 11/2003 | Bartur et al. |
| 6,675,294 B1 | 1/2004 | Gupta et al. |
| 6,687,437 B1 | 2/2004 | Starnes et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. .......... 370/338 |
| 6,801,767 B1 | 10/2004 | Schwartz et al. ......... 455/426.2 |
| 6,807,374 B1 | 10/2004 | Imajo et al. ................. 398/115 |
| 6,826,337 B2 | 11/2004 | Linnell |
| 6,847,856 B1 | 1/2005 | Bohannon |
| 6,865,390 B2 | 3/2005 | Goss et al. ................. 455/445 |
| 6,873,823 B2 | 3/2005 | Hasarchi et al. |
| 6,879,290 B1 | 4/2005 | Toutain et al. |
| 6,883,710 B2 | 4/2005 | Chung ........................ 235/385 |
| 6,885,846 B1 | 4/2005 | Panasik et al. ............... 455/41.2 |
| 6,889,060 B2 | 5/2005 | Fernando et al. |
| 6,909,399 B1 | 6/2005 | Zegelin et al. ............... 342/463 |
| 6,915,058 B2 | 7/2005 | Pons |
| 6,920,330 B2 | 7/2005 | Caronni et al. ........... 455/456.1 |
| 6,924,997 B2 | 8/2005 | Chen et al. |
| 6,930,987 B1 | 8/2005 | Fukuda et al. |
| 6,931,183 B2 | 8/2005 | Panak et al. ................. 385/101 |
| 6,933,849 B2 | 8/2005 | Sawyer ...................... 340/572.4 |
| 6,965,718 B2 | 11/2005 | Koertel ...................... 385/101 |
| 6,968,107 B2 | 11/2005 | Belardi et al. |
| 6,973,243 B2 | 12/2005 | Koyasu et al. |
| 6,974,262 B1 | 12/2005 | Rickenbach |
| 7,013,087 B2 | 3/2006 | Suzuki et al. ............... 398/115 |
| 7,020,473 B2 | 3/2006 | Splett ...................... 455/456.1 |
| 7,035,512 B2 | 4/2006 | Van Bijsterveld |
| 7,039,399 B2 | 5/2006 | Fischer .................... 455/422.1 |
| 7,054,513 B2 | 5/2006 | Herz et al. |
| 7,072,586 B2 | 7/2006 | Aburakawa et al. ......... 398/115 |
| 7,084,769 B2 | 8/2006 | Bauer et al. ............... 340/572.7 |
| 7,106,931 B2 | 9/2006 | Sutehall et al. |
| 7,127,176 B2 | 10/2006 | Sasaki |
| 7,142,503 B1 | 11/2006 | Grant et al. |
| 7,200,305 B2 | 4/2007 | Dion et al. |
| 7,269,311 B2 | 9/2007 | Kim et al. |
| 7,295,119 B2 | 11/2007 | Rappaport et al. |
| 7,310,430 B1 | 12/2007 | Mallya et al. |
| 7,324,730 B2 | 1/2008 | Varkey et al. |
| 7,349,633 B2 | 3/2008 | Lee et al. |
| 7,359,408 B2 | 4/2008 | Kim |
| 7,366,150 B2 | 4/2008 | Lee et al. |
| 7,409,159 B2 | 8/2008 | Izadpanah |
| 7,424,228 B1 | 9/2008 | Williams et al. |
| 7,444,051 B2 | 10/2008 | Tatat et al. |
| 7,450,853 B2 | 11/2008 | Kim et al. |
| 7,460,831 B2 | 12/2008 | Hasarchi |
| 7,469,105 B2 | 12/2008 | Wake et al. |
| 7,496,384 B2 | 2/2009 | Seto et al. |
| 2002/0003645 A1 | 1/2002 | Kim et al. |
| 2002/0048071 A1* | 4/2002 | Suzuki et al. ............... 359/173 |
| 2002/0075906 A1 | 6/2002 | Cole et al. ................. 370/535 |
| 2002/0092347 A1 | 7/2002 | Niekerk et al. |
| 2002/0111192 A1 | 8/2002 | Thomas et al. ............... 455/562 |
| 2002/0114038 A1 | 8/2002 | Arnon et al. |
| 2002/0126967 A1 | 9/2002 | Panak et al. |
| 2002/0130778 A1 | 9/2002 | Nicholson |
| 2002/0181668 A1 | 12/2002 | Masoian et al. ........... 379/56.3 |
| 2002/0190845 A1 | 12/2002 | Moore ...................... 340/10.3 |
| 2003/0007214 A1 | 1/2003 | Aburakawa et al. |
| 2003/0016418 A1 | 1/2003 | Westbrook et al. |
| 2003/0045284 A1 | 3/2003 | Copley et al. ............... 455/426 |
| 2003/0078074 A1 | 4/2003 | Sesay et al. |

| | | | | | | |
|---|---|---|---|---|---|---|
| 2003/0141962 A1 | 7/2003 | Barink ..................... 340/10.42 | | 2008/0124086 A1 | 5/2008 | Matthews |
| 2003/0161637 A1 | 8/2003 | Yamamoto et al. | | 2008/0124087 A1 | 5/2008 | Hartmann et al. |
| 2003/0165287 A1 | 9/2003 | Krill et al. ..................... 385/24 | | 2008/0145061 A1 | 6/2008 | Lee et al. |
| 2003/0174099 A1 | 9/2003 | Bauer et al. | | 2008/0150514 A1 | 6/2008 | Codreanu et al. |
| 2003/0209601 A1 | 11/2003 | Chung | | 2008/0194226 A1 | 8/2008 | Rivas et al. |
| 2004/0001719 A1 | 1/2004 | Sasaki | | 2008/0212969 A1 | 9/2008 | Fasshauer et al. |
| 2004/0008114 A1 | 1/2004 | Sawyer | | 2008/0219670 A1 | 9/2008 | Kim et al. |
| 2004/0017785 A1 | 1/2004 | Zelst ........................... 370/328 | | 2008/0232799 A1 | 9/2008 | Kim |
| 2004/0041714 A1 | 3/2004 | Forster | | 2008/0247716 A1 | 10/2008 | Thomas et al. |
| 2004/0043764 A1 | 3/2004 | Bigham et al. ............ 455/422.1 | | 2008/0253773 A1 | 10/2008 | Zheng |
| 2004/0047313 A1* | 3/2004 | Rumpf et al. ................ 370/335 | | 2008/0260388 A1 | 10/2008 | Kim et al. |
| 2004/0078151 A1 | 4/2004 | Aljadeff et al. | | 2008/0273844 A1 | 11/2008 | Kewitsch |
| 2004/0149736 A1 | 8/2004 | Clothier | | 2008/0298813 A1 | 12/2008 | Song et al. |
| 2004/0151503 A1 | 8/2004 | Kashima et al. | | 2008/0304831 A1 | 12/2008 | Miller, II et al. |
| 2004/0157623 A1 | 8/2004 | Splett | | 2008/0310848 A1 | 12/2008 | Yasuda et al. |
| 2004/0162115 A1 | 8/2004 | Smith et al. | | 2009/0041413 A1 | 2/2009 | Hurley |
| 2004/0162116 A1 | 8/2004 | Han et al. | | 2009/0047023 A1 | 2/2009 | Pescod et al. |
| 2004/0175173 A1 | 9/2004 | Deas | | | | |
| 2004/0202257 A1 | 10/2004 | Mehta et al. | | FOREIGN PATENT DOCUMENTS | | |
| 2004/0203704 A1 | 10/2004 | Ommodt et al. ........... 455/422.1 | | DE | 20104862 U1 | 8/2001 |
| 2004/0203846 A1 | 10/2004 | Caronni et al. | | DE | 10249414 A1 | 5/2004 |
| 2004/0204109 A1 | 10/2004 | Hoppenstein ............ 455/562.1 | | EP | 0477952 A2 | 2/1991 |
| 2004/0208526 A1 | 10/2004 | Mibu | | EP | 0477952 A3 | 9/1991 |
| 2004/0218873 A1 | 11/2004 | Nagashima et al. | | EP | 0461583 B1 | 3/1997 |
| 2004/0233877 A1 | 11/2004 | Lee et al. ..................... 370/338 | | EP | 0687400 | 11/1998 |
| 2004/0258105 A1 | 12/2004 | Spathas et al. .............. 370/539 | | EP | 0993124 A2 | 4/2000 |
| 2005/0052287 A1 | 3/2005 | Whitesmith et al. | | EP | 9003124 A3 | 4/2000 |
| 2005/0058451 A1 | 3/2005 | Ross ............................. 398/70 | | EP | 1202475 A2 | 5/2002 |
| 2005/0068179 A1 | 3/2005 | Roesner | | EP | 1363352 A1 | 11/2003 |
| 2005/0076982 A1 | 4/2005 | Metcalf et al. | | EP | 1391897 | 2/2004 |
| 2005/0078006 A1 | 4/2005 | Hutchins et al. | | EP | 1443687 A1 | 8/2004 |
| 2005/0093679 A1 | 5/2005 | Zai et al. | | EP | 1455550 A2 | 9/2004 |
| 2005/0099343 A1 | 5/2005 | Asrani et al. | | EP | 1501206 A1 | 1/2005 |
| 2005/0116821 A1 | 6/2005 | Wilsey et al. | | EP | 1503451 A1 | 2/2005 |
| 2005/0141545 A1 | 6/2005 | Fein et al. | | EP | 1511203 B1 | 3/2006 |
| 2005/0143077 A1 | 6/2005 | Charbonneau | | EP | 1693974 A1 | 8/2006 |
| 2005/0148306 A1 | 7/2005 | Hiddink | | EP | 1742388 A1 | 1/2007 |
| 2005/0159108 A1 | 7/2005 | Fletcher et al. | | GB | 2323252 A | 9/1998 |
| 2005/0174236 A1 | 8/2005 | Brookner | | GB | 2399963 A | 9/2004 |
| 2005/0201761 A1 | 9/2005 | Bartur et al. | | GB | 2428149 A | 1/2007 |
| 2005/0219050 A1 | 10/2005 | Martin | | JP | 5260018 A | 8/1993 |
| 2005/0224585 A1 | 10/2005 | Durrant et al. | | JP | 083450 A | 3/1997 |
| 2005/0226625 A1 | 10/2005 | Wake et al. ................... 398/115 | | JP | 9162810 A | 6/1997 |
| 2005/0232636 A1 | 10/2005 | Durrant et al. | | JP | 09-200840 | 7/1997 |
| 2005/0242188 A1 | 11/2005 | Vesuna | | JP | 1168675 A | 3/1999 |
| 2005/0252971 A1 | 11/2005 | Howarth et al. | | JP | 2000-152300 | 5/2000 |
| 2005/0259930 A1 | 11/2005 | Elkins et al. | | JP | 2000-341744 | 8/2000 |
| 2005/0266797 A1 | 12/2005 | Utsumi et al. .................... 455/7 | | JP | 2002-264617 | 9/2002 |
| 2005/0266854 A1 | 12/2005 | Niiho et al. .................... 455/445 | | JP | 2003-148653 | 5/2003 |
| 2005/0271396 A1 | 12/2005 | Iannelli ........................ 398/193 | | JP | 2003-172827 | 6/2003 |
| 2006/0002326 A1 | 1/2006 | Vesuna | | JP | 2004-172734 | 6/2004 |
| 2006/0017633 A1 | 1/2006 | Pronkine ..................... 343/729 | | JP | 2004-245963 | 9/2004 |
| 2006/0045054 A1 | 3/2006 | Utsumi et al. | | JP | 2004-247090 | 9/2004 |
| 2006/0062579 A1 | 3/2006 | Kim et al. | | JP | 2004-264901 | 9/2004 |
| 2006/0094470 A1 | 5/2006 | Wake et al. ................. 455/562.1 | | JP | 2004-265624 | 9/2004 |
| 2006/0104643 A1 | 5/2006 | Lee et al. | | JP | 2004-317737 | 11/2004 |
| 2006/0182446 A1 | 8/2006 | Kim et al. | | JP | 2004-349184 | 12/2004 |
| 2006/0182449 A1 | 8/2006 | Iannelli et al. ............... 398/186 | | JP | 2005-018175 | 1/2005 |
| 2006/0189354 A1 | 8/2006 | Lee et al. ..................... 455/561 | | JP | 2005-087135 | 4/2005 |
| 2006/0233506 A1 | 10/2006 | Noonan et al. | | JP | 2005-134125 | 5/2005 |
| 2006/0239630 A1 | 10/2006 | Hase et al. | | JP | 2007-228603 | 9/2007 |
| 2007/0009266 A1 | 1/2007 | Bothwell et al. ............. 398/161 | | JP | 2008-172597 | 7/2008 |
| 2007/0058978 A1 | 3/2007 | Lee et al. | | WO | WO 01/78434 A1 | 10/2001 |
| 2007/0149250 A1 | 6/2007 | Crozzoli et al. | | WO | WO0230141 A1 | 4/2002 |
| 2007/0166042 A1 | 7/2007 | Seeds et al. .................. 398/142 | | WO | WO02/102102 A1 | 12/2002 |
| 2007/0253714 A1 | 11/2007 | Seeds et al. .................. 398/115 | | WO | WO03/098175 A1 | 11/2003 |
| 2008/0013909 A1 | 1/2008 | Kostet et al. | | WO | WO2004/030154 A2 | 4/2004 |
| 2008/0013956 A1 | 1/2008 | Ware et al. | | WO | WO2004/047472 A1 | 6/2004 |
| 2008/0013957 A1 | 1/2008 | Akers et al. | | WO | WO2004/056019 A1 | 7/2004 |
| 2008/0014948 A1 | 1/2008 | Scheinert | | WO | WO2004056019 A1 | 7/2004 |
| 2008/0031628 A1 | 2/2008 | Dragas et al. | | WO | WO2004/086795 A2 | 10/2004 |
| 2008/0056167 A1 | 3/2008 | Kim et al. | | WO | WO2004/093471 A2 | 10/2004 |
| 2008/0058018 A1 | 3/2008 | Scheinert | | | | |

| WO | WO2004/093471 A3 | 10/2004 |
| WO | WO2004086795 A2 | 10/2004 |
| WO | WO2005/062505 A1 | 7/2005 |
| WO | WO2005/069203 A2 | 7/2005 |
| WO | WO2005/073897 A1 | 8/2005 |
| WO | WO2005/079386 A2 | 9/2005 |
| WO | WO2005/101701 A2 | 10/2005 |
| WO | WO2005/111959 A2 | 11/2005 |
| WO | WO2006/011778 A1 | 2/2006 |
| WO | WO2006/018592 A1 | 2/2006 |
| WO | WO2006/018592 A1 | 2/2006 |
| WO | WO2006/019392 A1 | 2/2006 |
| WO | WO2006/136811 A1 | 12/2006 |
| WO | WO2007/077451 A1 | 7/2007 |
| WO | WO2007/091026 A1 | 8/2007 |
| WO | WO2008/033298 A2 | 3/2008 |

OTHER PUBLICATIONS

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

Bakaul, M. et al., "Efficient Multiplexing Scheme for Wavelength-Interleaved DWDM Millimeter-Wave Fiber-Radio Systems," IEEE Photonics Technology Letters, vol. 17, No. 12, Dec. 2005.

D. Huang, C. Chiu, "A WLAN-Used Helical Antenna Fully Integrated with the PCMCIA Carrier," IEEE Trans. Ant. and Prop., vol. 53, No. 12, pp. 4164-4168, Dec. 2005.

Gibson et al., "Evanescent Field Analysis of Air-Silica Microstructure Waveguides," IEEE, 1-7803-7104-4/01, 2001, pp. 709-710.

ITU-T G.652, Telecommunication Standardization Sector of ITU, Jun. 2005, Series G: Transmission Systems and Media, Digital Systems and Networks, Transmission Media and Optical Systems Characteristics—Optical Fiber Cables, Characteristics of a Single-Mode Optical Fiber and Cable, ITU-T Recommendation G.652, 22 pages.

ITU-T G.657, Telecommunication Standardization Sector of ITU, Dec. 2006, Series G: Transmission Systems and Media, Digital Systems and Networks, Transmission Media and Optical Systems Characteristics—Optical Fiber Cables, Characteristics of a Bending Loss Insensitive Single Mode Optical Fiber and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Moreira, J.D. et al., "Diversity Techniques for OFDM Based WLAN Systems," pp. 1008-1011, PIMRC 2002 IEEE.

Niiho, T. et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58.

Paulraj, A. et al., "An Overview of MIMO Communications—A Key to Gigabit Wireless," Proceedings of the IEEE, vol. 92, No. 2, Feb. 2004.

Pickrell et al., "Novel Techniques for the Fabrication of Holey Optical Fibers," SPIE Conference Proceedings, vol, 4578, pp. 271-282, 2001.

RFID Technology Overview, 11 pages.

Roh, W. and Paulraj, A., "MIMO Channel Capacity for the Distributed Antenna Systems," Vehicular Technology Conference, 2002, proceedings, VTC 2002-Fall, 2002 IEEE 56th, vol. 2, Sep. 24-28, 2002, pp. 706-709.

Seto, I. et al., "Antenna-Selective Trasmit Diversity Technique for OFDM-Based WLANs with Dual-Band Printed Antennas," pp. 51-56, IEEE Communications Society/WCNC 2005.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118.

Wake, D. et al., "Passive Picocell: A New Concept in Wireless Network Infrastructure," Electronics Letters, vol. 33, No. 5, Feb. 27, 1997, pp. 404-406.

* cited by examiner

REDUNDANT TRANSPONDER ARRAY FOR A RADIO-OVER-FIBER OPTICAL FIBER CABLE

CROSS-REFERENCE TO RELATED APPLICATIONS

This application is a continuation-in-part of U.S. patent application Ser. No. 11/454,581, entitled "Transponder for a Radio-over-Fiber Optical Fiber Cable," filed on Jun. 16, 2006, which application is incorporated by reference herein in its entirety.

BACKGROUND OF THE INVENTION

1. Field of the Invention

The present invention relates generally to radio-over-fiber (RoF) systems, and in particular relates to optical fiber cables for such systems that support radio-frequency (RF) transponders.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, hospitals, libraries, etc.). The typical wireless communication system has a head-end station connected to an access point device via a wire cable. The access point device includes an RF transmitter/receiver operably connected to an antenna, and digital information processing electronics. The access point device communicates with wireless devices called "clients," which must reside within the wireless range or a "cell coverage area" in order to communicate with the access point device.

The size of a given cell is determined by the amount of RF power the access point device transmits, the receiver sensitivity, antenna parameters and the RF environment, as well as by the RF transmitter/receiver sensitivity of the wireless client device. Client devices usually have a fixed RF receiver sensitivity so that the above-mentioned access point device properties largely determine the cell size. Connecting a number of access point devices to the head-end controller creates an array of cells that provide cellular coverage over an extended region.

One approach to deploying a wireless communication system involves creating "picocells," which are wireless cells having a radius in the range from about a few meters up to about 20 meters. Because a picocell covers a small area (a "picocell area"), there are typically only a few users (clients) per picocell. A closely packed picocellular array provides high per-user data-throughput over the picocellular coverage area. Picocells also allow for selective wireless coverage of small regions that otherwise would have poor signal strength when covered by larger cells created by conventional base stations.

One type of wireless system for creating picocells utilizes RF signals sent over optical fibers—called "radio over fiber" or "RoF" for short. Such systems include a head-end station optically coupled to a transponder via an optical fiber link. Unlike a conventional access point device, the transponder has no digital information processing capability. Rather, the digital processing capability resides in the head-end station. The transponder is transparent to the RF signals and simply converts incoming optical signals from the optical fiber link to electrical signals, which are then converted to electromagnetic signals via an antenna. The antenna also receives electromagnetic signals (i.e., electromagnetic radiation) and converts them to electrical signals (i.e., electrical signals in wire). The transponder then converts the electrical signals to optical signals, which are then sent to the head-end station via the optical fiber link.

Multiple transponders are typically distributed throughout an optical fiber cable as a "transponder array," wherein the optical fiber cable carries optical fiber links optically coupled to the transponders. The picocells associated with the transponder array form a picocell coverage area High-directivity transponder antennas can be used to reduce picocell crosstalk.

One application of picocellular wireless systems involves providing a number of different services (e.g., Wireless Local Area Network (LAN), voice, RFID tracking, temperature and/or light control) within a building, usually by deploying one or more optical fiber cables close to the ceiling and/or by using different RF frequency bands. Since the transponders are typically sealed within or onto the outside of the optical fiber cables, access to the transponders after installation is limited. Thus, in the case of a transponder failure, it can be difficult, expensive and time consuming to repair or replace the transponder. Further, the disruption of the particular service provided by the transponder can be a serious inconvenience to the end-users and to a business that relies on the picocellular wireless system being "up" continuously. Accordingly, there is a need for systems and methods for dealing with transponder failures in a RoF optical fiber cable.

SUMMARY OF THE INVENTION

One aspect of the invention is a method of providing transponder redundancy in a RoF optical fiber cable. The method includes providing transponders with first and second antennas adapted to operate at respective first and second normal operating frequencies so as to form corresponding first and second substantially co-located picocells. The method also includes forming at least the first picocell at a transponder by providing the transponder with at least a first electrical signal having the first frequency. In the event that a transponder fails to form its corresponding first picocell, the method further includes forming a backup picocell that covers at least a substantial portion of the failed transponder's first picocell. This is accomplished by providing the second antenna of an adjacent "backup" transponder with the first electrical signal of the failed transponder.

Another aspect of the invention is a redundant transponder array of two or more transponders for a RoF optical fiber cable. The transponders include first and second antennas having respective first and second normal operating frequencies. The transponders are adapted to form corresponding first and second substantially co-located picocells in response to respective first and second electrical signals having the first and second frequencies being provided to the first and second antennas. The second antenna is adapted to form a backup picocell that covers at least a substantial portion of the first picocell of the adjacent transponder when fed the electrical signal of the first frequency.

Another aspect of the invention is a RoF optical fiber cable system with transponder redundancy. The system includes two or more transponders adapted to convert RF-modulated optical signals to corresponding RF electrical signals and vice versa. The transponders include first and second antennas adapted to form first and second substantially co-located picocells in response to first and second downlink RF signals at respective first and second frequencies. The first and second picocells of adjacent transponders are substantially non-overlapping (i.e., substantially non-interfering). The system also includes corresponding two or more uplink and downlink optical fiber pairs, with each pair optically coupled to a corresponding transponder. The second antenna is adapted to form a backup picocell that substantially overlaps the first picocell of the adjacent transponder when provided with the first downlink RF signal of the adjacent transponder.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to same or like parts.

In the discussion below, reference is made to a picocell and a picocell area associated with a failed transponder. In the context of a failed transponder, the picocell and picocell area refer to those associated with the failed transponder while it was operative.

Also, the term "redundant transponder array" is used herein to describe the array of two or more transponders as adapted according to the present invention to provide backup picocellular coverage for one or more failed transponders in the array. In addition, the term "picocell area" is used to describe the coverage area or "footprint" of a given picocell and is a rough measure of the size of a picocell even though a picocell is three-dimensional. Further, the picocells of adjacent transponders are shown in the Figures to be non-overlapping (and thus non-interfering) even though in practice there is some overlap and thus some interference, the degree of which is related to the relative signal strengths of the adjacent picocells. Thus, the phrase "substantially non-overlapping" as used in connection with picocells of the same frequency formed by adjacent transponders is meant to distinguish from the situation wherein picocells 40A and 40B formed by the same transponder are substantially co-located—i.e., at least substantially overlapping—when the transponder operates in the normal operating mode. The amount of overlap of picocells using different channel frequencies can be substantial since the different frequencies do not interfere with each other.

Also, downlink and uplink electrical signals are represented by SD and SU respectively, downlink and uplink optical signals are represented as SD' and SU' respectively, and downlink and uplink electromagnetic (i.e., free-space radiation) signals are represented as SD" and SU" respectively.

When a signal has a particular frequency $f_A$ or $f_B$, then the corresponding subscript A or B is used.

Generalized Picocellular Wireless System with Redundant Transponder Array

Figure 1:
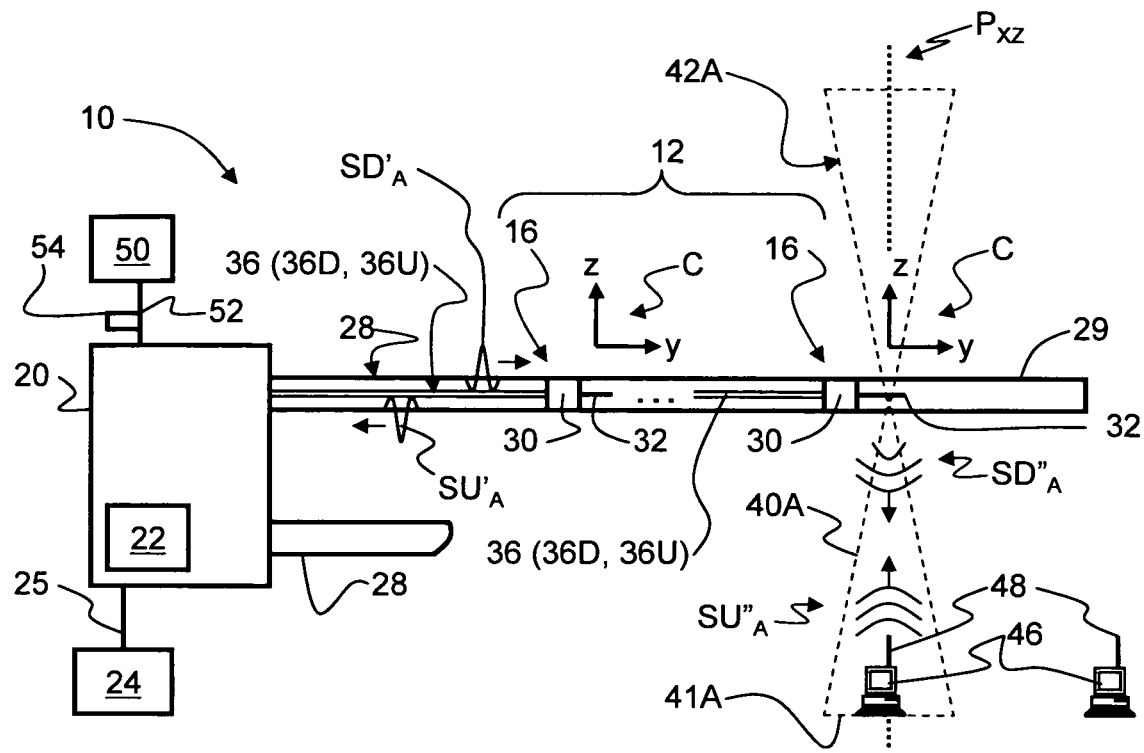
FIG. 1 is a schematic diagram of a generalized embodiment of a RoF picocellular wireless system that utilizes an optical fiber cable that supports the redundant transponder array of the present invention, illustrating the operation of the system at a first frequency $f_A$.
Figure 2:
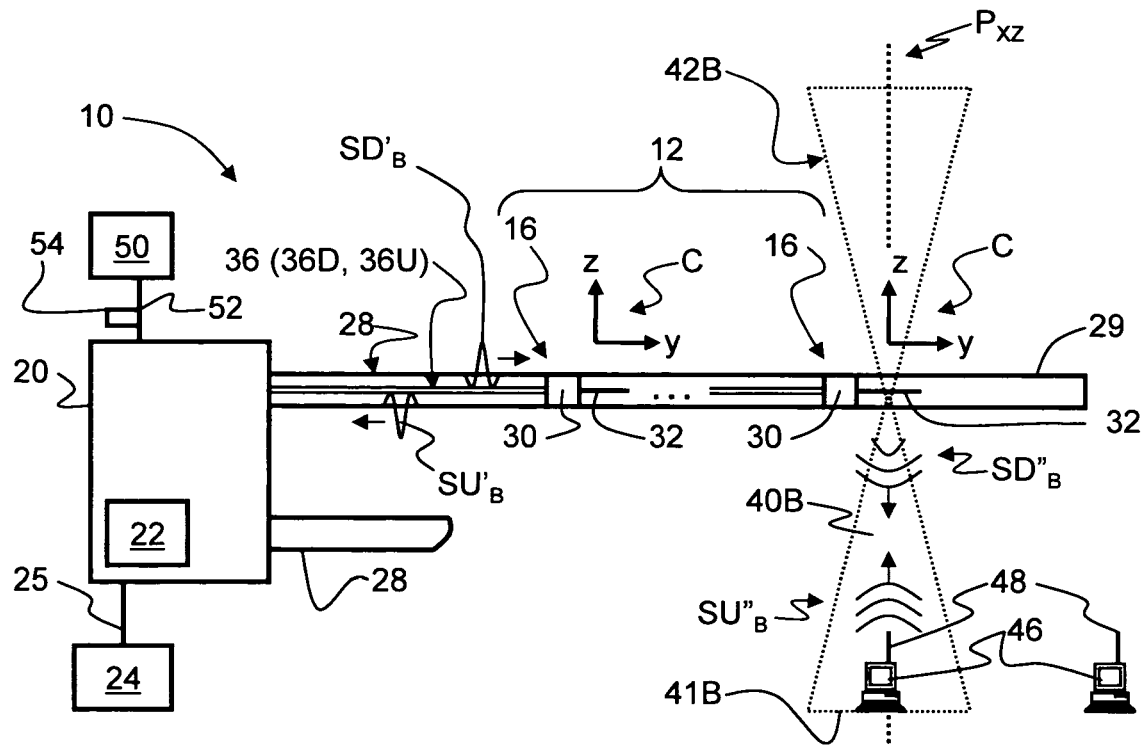
FIG. 2 is similar to FIG. 1 and illustrates the operation of the system at a second frequency $f_B$.

FIG. 1 and FIG. 2 are schematic diagrams of a generalized embodiment of a RoF picocellular wireless system 10 that utilizes a redundant transponder array 12, according to the present invention, wherein the redundant transponder array includes two or more transponders 16. System 10 also includes a head-end station 20 adapted to transmit, receive and/or process RF optical signals, and that is also adapted to control the operation of transponders 16, as described below. Head-end station 20 includes a controller 22, also discussed below. In an example embodiment, head-end station 20 is operably coupled to an outside network 24 via a network link 25, and the head-end station serves as a pass-through for RF signals sent to and from the outside network. System 10 also includes one or more optical fiber cables 28 each optically coupled to head-end station 20 and each adapted to operably support a redundant transponder array 12.

In an example embodiment, each optical fiber cable 28 has a protective outer jacket 29, such as a primary coating resistant to mechanical and/or chemical damage. In an example embodiment, transponders 16 are operably supported within protective outer jacket 29, while in another example embodiment, some or all of the transponders are supported outside of the protective outer jacket, as described below.

In an example embodiment, system 10 is powered by a power supply 50 electrically coupled to head-end station 20 via an electrical power line 52 that carries electrical power signals 54.

In an example embodiment, each transponder 16 in redundant transponder array 12 includes a converter unit 30 and a directive antenna system 32 electrically coupled thereto. In an example embodiment, directive antenna system 32 has a dipole radiation characteristic the same as or substantially similar to that of an ideal dipole wire antenna at its normal operating frequency when the length of the antenna is less than the radiation wavelength. Note that dipole radiation is omnidirectional in a plane perpendicular to the radiation source (e.g., a wire), but is directive outside of this plane. Transponders 16 are discussed in greater detail below.

In an example embodiment, each optical fiber cable 28 includes two or more optical fiber RF transmission links 36 optically coupled to respective two or more transponders 16. In an example embodiment, each optical fiber RF transmission link 36 includes a downlink optical fiber 36D and an uplink optical fiber 36U. Example embodiments of system 10 include either single-mode optical fiber or multi-mode optical fiber for downlink and uplink optical fibers 36D and 36U. The particular type of optical fiber depends on the application of system 10, as well as on the desired performance and cost considerations. For many in-building deployment applications, maximum transmission distances typically do not exceed 300 meters. The maximum length for the intended RoF transmission needs to be taken into account when considering using multi-mode optical fibers for downlink and uplink optical fibers 36D and 36U. For example, it is known that a 1400 MHz·km multi-mode fiber bandwidth-distance product is sufficient for 5.2 GHz transmission up to 300 meters. In an example embodiment, the present invention employs 50 μm multi-mode optical fiber for the downlink and uplink optical fibers 36D and 36U, and E/O converters (introduced below) that operate at 850 nm using commercially available vertical-cavity surface-emitting lasers (VCSELs) specified for 10 Gb/s data transmission.

In an example embodiment, RoF picocellular wireless system 10 of the present invention employs a known telecommunications wavelength, such as 850 nm, 1,310 nm, or 1,550 nm. In another example embodiment, system 10 employs other less common but suitable wavelengths, such as 980 nm.

Also shown in FIG. 1 and FIG. 2 is a local x-y-z Cartesian coordinate system C at each directive antenna system 32 for the sake of reference. In coordinate system C, the x-direction is into the paper and locally perpendicular to optical fiber cable 28, the z-direction is in the plane of the paper and locally perpendicular to the optical fiber cable, and the y-direction is in the plane of the paper and locally parallel to the optical fiber cable. In an example embodiment, directive antenna system 32 is sufficiently stiff so that optical fiber cable 28 is locally straight at the directive antenna system location. In an example embodiment, directive antenna system 32 is located relatively far away from converter unit 30 (e.g., up to 2 meters), while in other example embodiments the directive antenna system is located relatively close to the converter unit (e.g., a few centimeters away), or even directly at the converter unit. In an example embodiment, directive antenna system 32 lies along the optical fiber cable, i.e., along the local y-direction.

Each transponder 16 in redundant transponder array 12 is adapted to form at least one picocell 40 (i.e., picocell 40A and/or 40B). With reference to FIG. 1, in an example embodiment, a picocell 40A having an associated picocell area 41A is formed at a first RF signal frequency $f_A$. Picocell 40A is formed by directive antenna system 32 via electromagnetic transmission and reception at a RF frequency $f_A$ when the transponder is addressed, e.g., receives a downlink optical signal $SD'_A$ at frequency $f_A$ from head-end station 20 and/or an uplink electromagnetic signal $SU''_A$ at frequency $f_A$ from a client device 46. Radiation pattern 42A from directive antenna system 32 defines the size and shape of picocell 40A. Client device 46, which is shown in the form of a computer as one example of a client device, includes an antenna system 48 (e.g., a wireless card) adapted to electromagnetically communicate with (i.e., address) transponder 16 and directive antenna system 32 thereof via electromagnetic uplink signal $SU''$ at one or two RF frequencies, e.g., at frequencies $f_A$ and/or $f_B$.

With reference now to FIG. 2, in an example embodiment, directive antenna system 32 is adapted to form at a second RF frequency $f_B$ a second picocell 40B having an associated picocell area 41B. Picocell 40B is formed in the same manner as picocell 40A, except that the downlink and uplink signals have a RF frequency $f_B$. Picocell 40B has an associated radiation pattern 42B. In an example embodiment, picocells 40A and 40B are substantially co-located, meaning that they overlap or at least substantially overlap, while picocells of the same frequency formed by adjacent transponders do not substantially overlap (i.e., do not substantially interfere). In an example embodiment, picocells 40A and 40B are used to provide different services, such as voice and data, respectively, within substantially the same picocell area 41 formed by picocell areas 41A and 41B.

In an example embodiment, antenna radiation patterns 42A and 42B are centered about the local x-z plane $P_{xz}$ as viewed edge-on as illustrated as a dotted line in FIG. 1 and FIG. 2. This creates picocells 40A and 40B that are locally perpendicular to optical fiber cable 28. Such radiation patterns are created in an example embodiment of the present invention by directive antenna system 32 being adapted to form dipole (or dipole-like) radiation patterns at different RF frequencies $f_A$ and $f_B$.

In an example embodiment, only a portion of radiation patterns 42A and 42B are used to form corresponding picocells 40A and 40B, e.g., the portion of the radiation pattern extending in the -z direction (i.e., below optical fiber cable 28), as shown in FIGS. 1 and 2.

Redundant Transponder Array Supported by Optical fiber Cable

Figure 3:
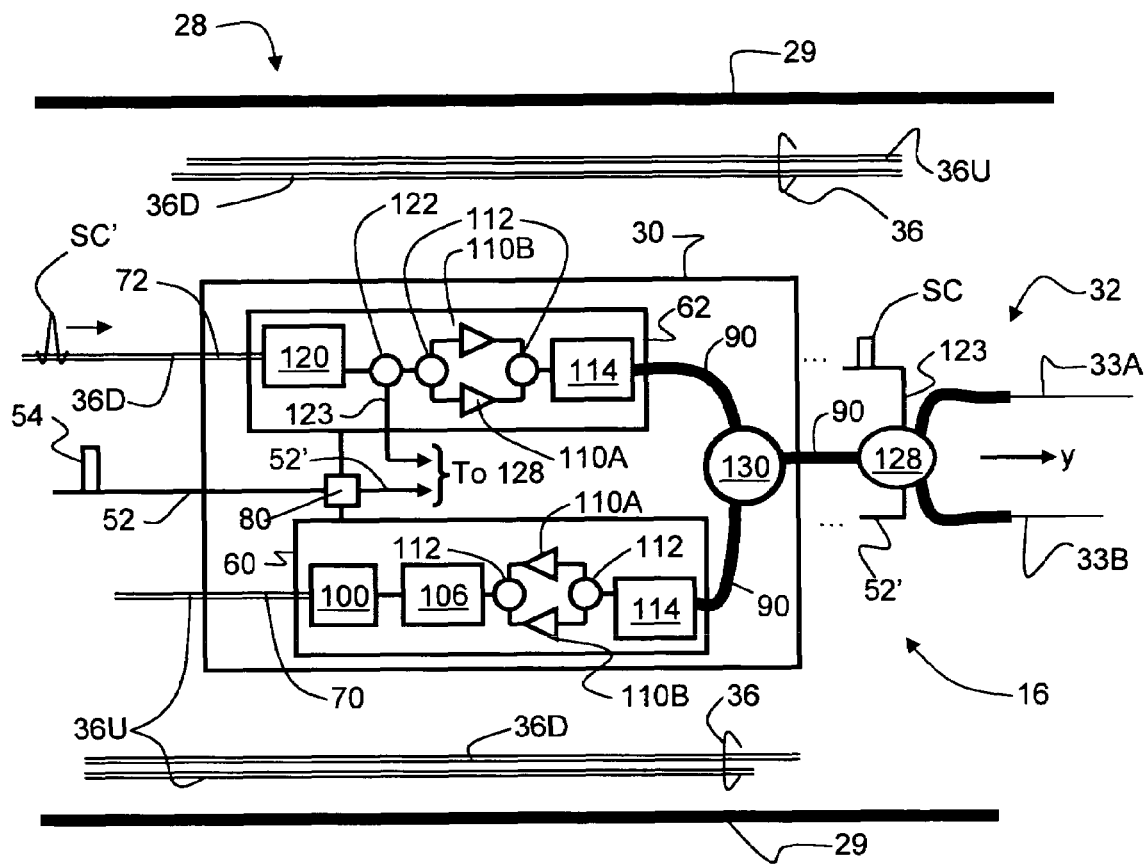
FIG. 3 is a detailed schematic diagram of an example embodiment of a converter unit and a directive antenna system for the transponders making up the redundant transponder array of the present invention, wherein the directive antenna system includes first and second antennas that have different normal operating frequencies.

FIG. 3 is a schematic close-up view of an example embodiment of one of the transponders 16 of redundant transponder array 12 as operably supported by optical fiber cable 28. In an example embodiment, at least a portion of each transponder 16 is included within protective outer jacket 29. In another example embodiment (not shown), the entirety of each transponder 16 is located outside of protective outer jacket 29 and is secured thereto, e.g., by a shrink-wrap layer.

As discussed above, transponder 16 includes a converter unit 30. Converter unit 30 includes an electrical-to-optical (E/O) converter 60 adapted to convert an electrical signal into a corresponding optical signal, and an optical-to-electrical (O/E) converter 62 adapted to convert an optical signal into a corresponding electrical signal. E/O converter 60 is optically coupled to an input end 70 of uplink optical fiber 36U and O/E converter 62 is optically coupled to an output end 72 of downlink optical fiber 36D.

In an example embodiment, optical fiber cable 28 includes or otherwise supports electrical power line 52, and converter unit 30 includes a DC power converter 80 electrically coupled to the electrical power line, to E/O converter 60 and O/E converter 62. DC power converter 80 is adapted to change the voltage levels and provide the power required by the power-consuming components in converter unit 30. In an example embodiment, DC power converter 80 is either a DC/DC power converter or an AC/DC power converter, depending on the type of power signal 54 carried by electrical power line 52.

In the example embodiment of FIG. 3, E/O converter 60 includes a laser 100. In an example embodiment, laser 100 is adapted to deliver sufficient dynamic range for one or more RoF applications. Examples of suitable lasers 100 include laser diodes, distributed feedback (DFB) lasers, Fabry-Perot (FP) lasers, and VCSELs. Laser 100 is optically coupled to an input end 70 of uplink optical fiber 36U, and a bias-T unit 106 electrically coupled to the laser. Amplifiers 110A and 110B are electrically coupled to the bias-T unit via a (passive) diplexer 112, which is adapted to direct electrical signals of frequencies $f_A$ and $f_B$ to respective amplifiers 110A and 110B. Diplexers 112 are thus referred to herein as "$f_A/f_B$ diplexers." Amplifiers 110A and 110B are adapted to amplify RF signals of frequency $f_A$ and $f_B$, respectively. A RF filter 114 is electrically coupled to the amplifiers via another $f_A/f_B$ diplexer 112, and is also electrically coupled to a corresponding RF cable section 90.

Also in an example embodiment, O/E converter 62 includes a photodetector 120 optically coupled to output end 72 of downlink optical fiber 36D. Photodetector 120 is electrically coupled to a (passive) diplexer 122 adapted to direct a low-frequency control signal to a control-signal line 123, as described below. Diplexer 122 is thus referred to herein as a "control-signal diplexer." Control-signal diplexer 122 is coupled to a $f_A/f_B$ diplexer 112, which in turn is electrically coupled to amplifiers 110A and 110B. The outputs of amplifiers 110A and 110B are coupled to another $f_A/f_B$ diplexer 112, which is electrically coupled to a RF filter 114. A RF cable section 90 is electrically coupled to the output end of filter 114.

In an example embodiment, directive antenna system 32 of transponder 16 of FIG. 3 includes an antenna 33A adapted to transmit and receive at a normal operating frequency $f_A$, and an antenna 33B adapted to transmit and receive at a normal operating frequency $f_B$. In an example embodiment, antennas 33A and 33B are electrically connected via respective RF cable sections 90 to a signal-directing element 128, such as an active diplexer. An electrical power line extension 52' from DC power converter 80 is electrically coupled to signal-directing element 128 to provide power thereto. Also, control-signal line 123 from control-signal diplexer 122 is electrically coupled to signal-directing element 128. Signal-directing element 128 is in turn electrically connected to a circulator 130 via another RF cable section 90. Circulator 130 is electrically connected to RF filters 114 of E/O converter 60 and O/E converter 62 via respective other RF cable sections 90.

With reference also to FIG. 1, in an example embodiment of the operation of transponder 16 of FIG. 3, a low-frequency (e.g., 10 MHz) optical control signal SC' is sent over downlink optical fiber 36D and is received by photodetector 120. Photodetector 120 converts optical control signal SC' into a corresponding electrical control signal SC. Because electrical control signal SC has a low frequency compared to RF downlink electrical signals SD, it is directed to control-signal line 123 by control-signal diplexer 122, and is received by signal-directing element 128. Electrical control signal SC is adapted to place signal-directing element 128 in one of two possible operating modes: a normal operating mode or a backup operating mode. It is first assumed that transponder 16 is to operate in the normal operating mode. Accordingly, electrical control signal SC is adapted to place signal-directing element 128 in the normal operating mode, wherein downlink electrical signals $SD_A$ and $SD_B$ are directed to respective antennas 33A and 33B.

A downlink optical signal $SD'_A$ traveling in downlink optical fiber 36D exits this optical fiber at output end 72 and is received by photodetector 120. Photodetector 120 converts downlink optical signal $SD'_A$ into a corresponding electrical downlink signal $SD_A$. Because electrical downlink signal $SD_A$ has a relatively high frequency as compared to control-signal SC, control-signal diplexer 122 sends electrical signal $SD_A$ onward to amplifiers 110A and 110B. Electrical signal $SD_A$ is directed by $f_A/f_B$ diplexer 112 to amplifier 110A, which amplifies the signal. The downstream $f_A/f_B$ diplexer 112 then directs amplified electrical signal $SD_A$ to RF filter 114, which filters this signal. Filtered electrical signal $SD_A$ then travels over RF cable section 90 to circulator 130 and to signal-directing element 128, which in the normal operating mode, directs the signal to antenna 33A. Antenna 33A converts electrical signal $SD_A$ into a corresponding electromagnetic signal $SD''_A$, which then travels to one or more client devices 46 within the corresponding picocell 40A (FIG. 1).

Similarly, antenna 33A receives one or more electromagnetic uplink signals $SU''_A$ from corresponding one or more client devices 46 within picocell 40A and converts each such signal to a corresponding electrical signal $SU_A$. This electrical signal is directed by signal-directing element 128 to travel over to circulator 130 via the corresponding RF cable section 90. Circulator 130 in turn directs electrical uplink signal $SU_A$ to RF filter 114 in E/O converter 60. RF filter 114 filters electrical uplink signal $SU_A$ and passes it along to $f_A/f_B$ diplexer 112, which sends the signal to amplifier 110A, which amplifies the signal. Amplified electrical signal $SU_A$ then travels to the next $f_A/f_B$ diplexer 112, which directs the signal to bias-T unit 106. Bias-T unit 106 conditions electrical signal $SU_A$—i.e., combines a DC signal with the electrical RF signal so it can drive (semiconductor) laser 100 above threshold using a DC current source (not shown) and independently modulate the power around its average value as determined by the provided DC current. The conditioned electrical signal $SU_A$ then travels to laser 100, which converts the electrical signal to a corresponding optical signal $SU'_A$ that is sent to head-end station 20 for processing.

Essentially the same procedure is followed for the operation of transponder 16 for downlink and uplink signals having frequency $f_B$, wherein amplifiers 110B amplifies electrical signal $SD_B$, and wherein antenna 33B is used for transmission and reception of downlink and uplink electromagnetic signals $SD''_B$ and $SU''_B$, respectively. RF communication with client device(s) 46 at frequency $f_B$ occurs within picocell 40B.

Transponders 16 of the present invention differ from the typical access point device associated with wireless communication systems in that the preferred embodiment of the transponder has just a few signal-conditioning elements and no digital information processing capability. Rather, the information processing capability is located remotely in head-end station 20. This allows transponder 16 to be very compact and virtually maintenance free. In addition, the preferred example embodiment of transponder 16 consumes very little power, is transparent to RF signals, and does not require a local power source, as described below. Moreover, if system 10 needs to be changed (e.g., upgraded), the change can be performed at head-end station 20 without having to change or otherwise alter transponders 16.

Example Directive Antenna System

In an example embodiment of transponder 16 such as the one shown in FIG. 3, directive antenna system 32 includes one or more antennas 33. In an example embodiment, antennas 33 are or include respective wires oriented locally parallel to optical fiber cable 28 (i.e., along the y-axis). The ability of directive antenna system 32 to lie along the direction of optical fiber cable 28 allows for the easy integration of the directive antenna system into the optical fiber cable relative to other types of directional antennas, such as patch antennas. In an example embodiment wherein directive antenna system 32 is a dipole-type antenna, the directive antenna system includes a circuit-based antenna having a dipole radiation pattern characteristic, such as available over the Internet from Winizen Co., Ltd., Kyounggi-do 429-22, Korea In an example embodiment, picocells 40A and 40B are elongated due to directive antenna system 32 having an asymmetric power distribution in the local x-y plane due to the different power decay rates in the different directions at operating frequencies $f_A$ and $f_B$. Omni-directional antennas, such as vertical dipole antennas, typically have relatively shallow RF power decay rates. Directive antennas, such as microstrip patches, can have an asymmetric radiation pattern in the x-y plane that can create asymmetric cells. However, these antennas require proper alignment in space. In an example embodiment, the directive antenna system 32 of the present invention produces predictable radiation patterns without any orientation tuning of individual antennas. This is because in an example embodiment, the directive antenna system 32 is supported by optical fiber cable 28 in a manner that allows for the picocell location and orientation to be determined by orienting optical fiber cable 28 rather than orienting individual antennas per se. This makes optical fiber cable 28 easier to manufacture and deploy relative to using other more complex directional antenna systems.

Figure 4:
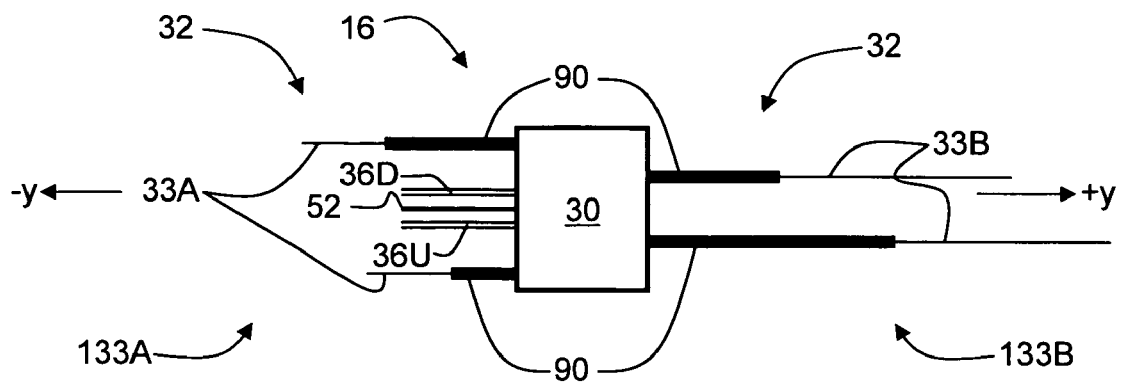
FIG. 4 is a schematic diagram of an example embodiment of a transponder of the redundant transponder array of the present invention, wherein the directive antenna system includes two pairs of wire antennas, and wherein the antenna pairs have different normal operating frequencies.

FIG. 4 is a schematic diagram of an example embodiment of transponder 16 with a directive antenna system 32 that includes a pair 133A of wire antennas 33A and a pair 133B of wire antennas 33B, with each wire antenna connected to converter unit 30 via respective RF cable sections 90. Antenna pairs 133A and 133B may be designed, for example, to transmit and receive at the $f_A$~5.2 GHz and $f_B$~2.4 GHz frequency bands, respectively (i.e., the IEEE 802 a/b/g standard frequency bands). In an example embodiment, the 2.4 GHz frequency band is used for voice service and the 5.2 GHz band is used for data service. The judicious use of RF cable sections 90 in this example embodiment mitigates fading and shadowing effects that can adversely affect the respective radiation patterns 42A and 42B of antenna pairs 133A and 133B, and thus the size and shape of the corresponding picocells 40A and 40B (FIG. 1 and FIG. 2).

Figure 5:
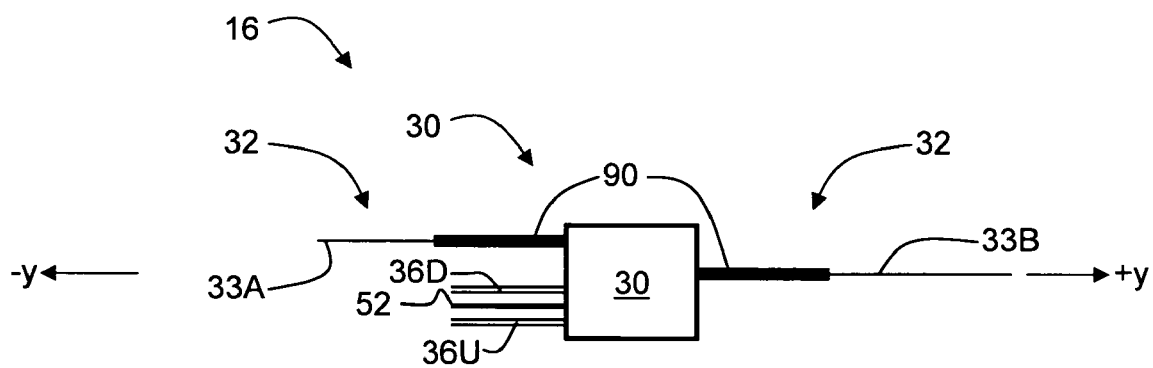
FIG. 5 is a schematic diagram of a simplified version of the transponder of FIG. 4, wherein the directive antenna system includes two antennas, with one antenna having a normally operating frequency $f_A$ in the 5.2 GHz band and the other having a normal operating frequency $f_B$ in the 2.4 GHz band.

FIG. 5 is a schematic diagram of a simplified version of transponder 16 of FIG. 4, wherein directive antenna system 32 includes two antennas 33, labeled for convenience as 33A and 33B, wherein antenna 33A is designed to operate at a preferred frequency of $f_A$~5.2 GHz and antenna 33B is designed to operate at preferred frequency $f_B$~2.4 GHz. Antennas 33A and 33B are oriented along optical fiber cable 28 (i.e., in the −y-direction and +y direction, respectively).

Figure 6:
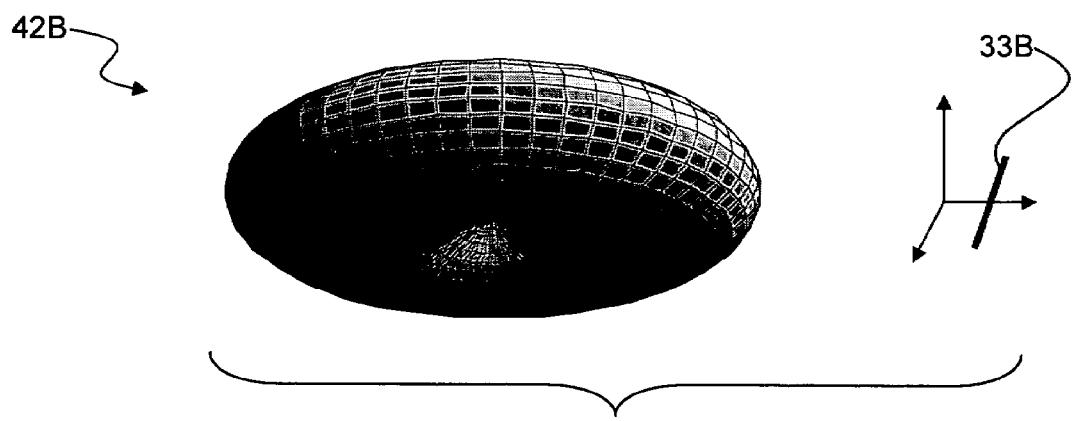
FIG. 6 is a perspective diagram of the radiation pattern formed by the 2.4 GHz antenna of the simplified directive antenna system of FIG. 5 operating at its normal operating frequency of 2.4 GHz.

FIG. 6 is a perspective diagram of the radiation pattern 42B formed by antenna 33B in the simplified dipole-type directive antenna system 32 of FIG. 5. The radiation pattern 42B of FIG. 6 was obtain by computer simulation based on antenna 33B having a length L of 11 cm, and operating the antenna at its preferred operating frequency of $f_B$=2.4 GHz. In an example embodiment, the length L of each antenna 33A and 33B is less than the radiation wavelength in order to maintain donut-shaped directivity so that the corresponding picocells 40A and 40B are directed locally perpendicular to optical fiber cable 28. For example, for antenna 33B, L=11 cm<λ=12.5 cm at $f_B$=2.4 GHz. A similar radiation pattern 42A is created by operating antenna 33A at its normal operating frequency of $f_A$=5.2 GHz.

Optical Fiber Cable with Redundant Transponder Array

Figure 7:
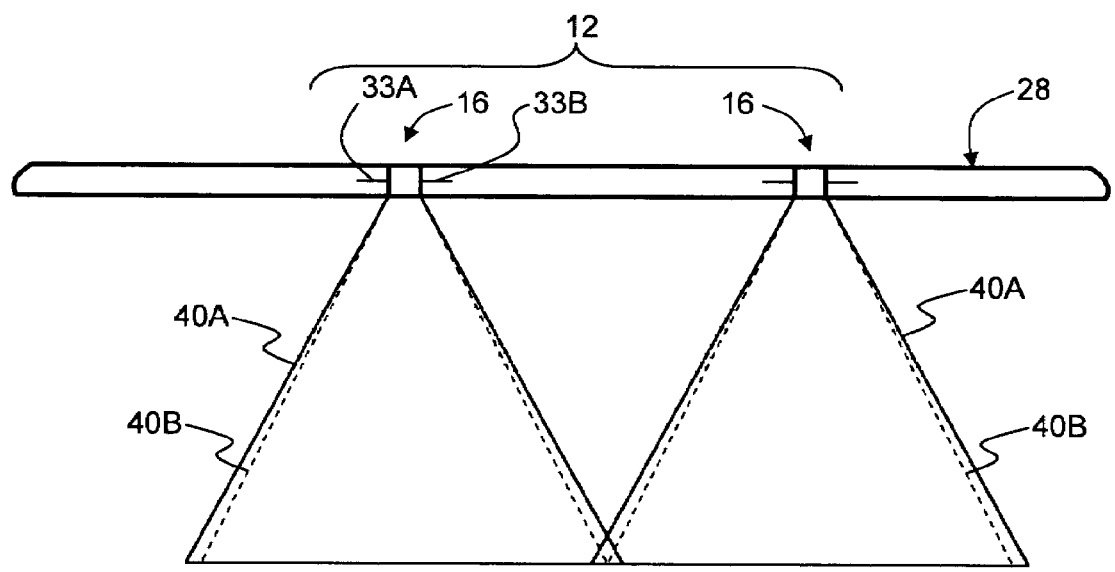
FIG. 7 is a schematic side view of a section of the optical fiber cable of FIG. 1, showing two transponders in the redundant transponder array, with each transponder having the simplified directive antenna system of FIG. 5, and also schematically showing the substantially co-located picocells formed by each transponder when the 2.4 GHz and 5.2 GHz antennas operate at their normal operating frequencies.

FIG. 7 is a schematic side view of a section of optical fiber cable 28 showing a redundant transponder array 12 operatively supported thereby and showing two transponders 16 in the array. Each transponder 16 has an antenna system 32 having the simplified directive antenna system 32 of FIG. 5 for the sake of illustration. FIG. 7 also shows the associated substantially co-located picocells 40A and 40B formed when antennas 33A and 33B in redundant transponder array 12 are operated at their normal operating frequencies of $f_A$=5.2 GHz and $f_B$=2.4 GHz, respectively.

Figure 8:
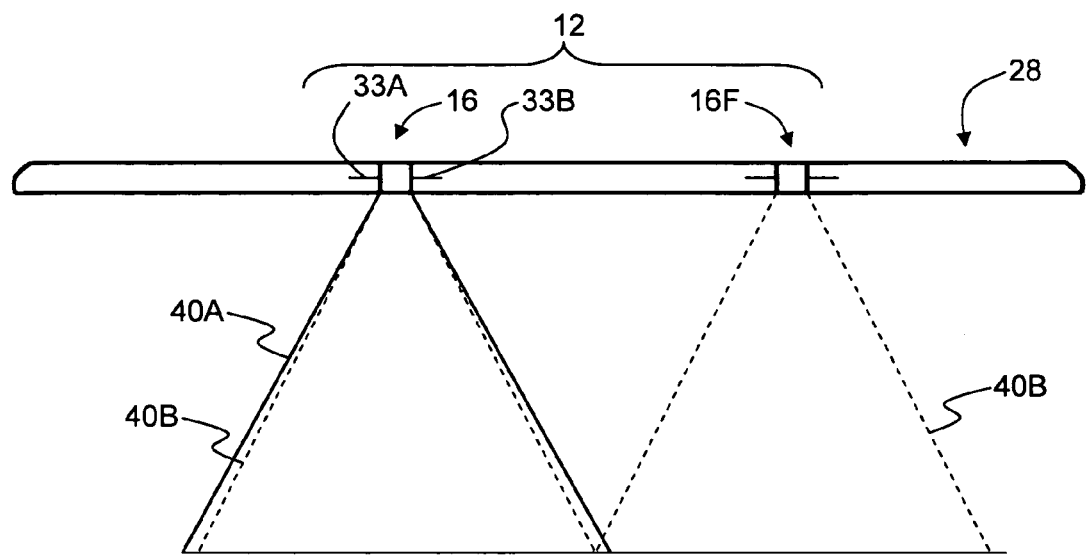
FIG. 8 is similar to FIG. 7 and shows the failure of the rightmost transponder at 5.2 GHz and thus the absence of the 5.2 GHz picocell for the failed transponder.

FIG. 8 is similar to FIG. 7 and shows a failed transponder 16F that fails to operate at 5.2 GHz, resulting in the disappearance of the corresponding picocell 40A for the failed transponder. This creates a "dead zone" at the $f_A$=5.2 GHz frequency for the failed transponder.

The present invention includes a method of providing transponder redundancy using redundant transponder array 12 in a RoF wireless picocellular system such as system 10. The method involves exploiting the change in directivity of directive antenna systems 32 in redundant transponder array 12 so that an operative transponder 16 can provide backup picocell coverage for an adjacent failed transponder 16F. In particular, the method includes feeding the 2.4 GHz antenna 33B in the adjacent "backup" transponder 16 with the 5.2 GHz downlink electrical signal $SD_A$ associated with failed transponder 16F, as described below.

Figure 9:
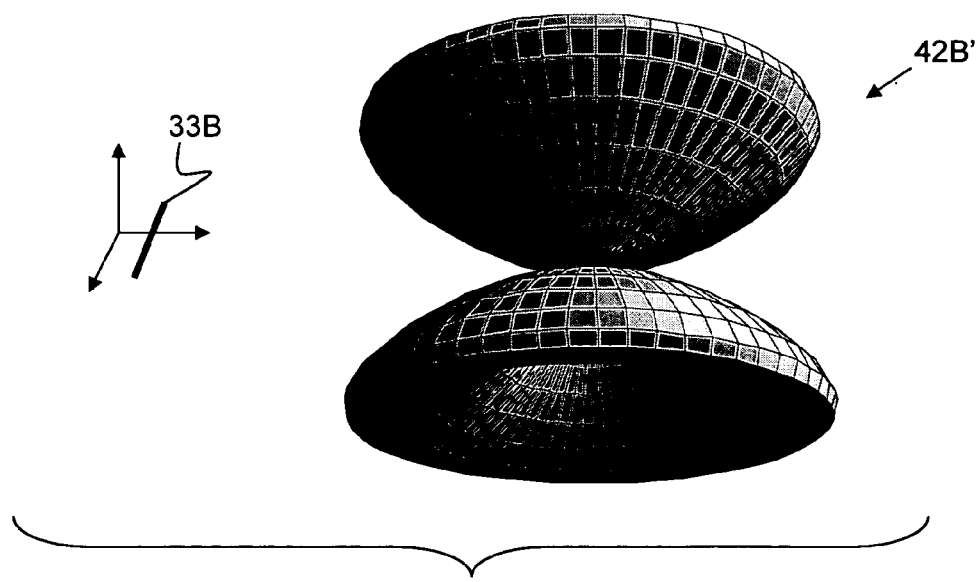
FIG. 9 is a perspective diagram of the radiation pattern formed by operating the 2.4 GHz antenna in the directive antenna system of FIG. 5 at 5.2 GHz.

When antenna 33B operates with a frequency different from its normal operating frequency $f_B$ of 2.4 GHz, its radiation pattern changes and therefore its directivity changes. FIG. 9 is a perspective diagram of a radiation pattern 42B' formed by 2.4 GHz antenna 33B in the directive antenna system 32 of FIG. 5 when it is made to operate at 5.2 GHz.

Radiation pattern 42B' of FIG. 9 is more directive along the y-axis than when antenna 33B is operated at its normal operating frequency of 2.4 GHz.

Figure 10:
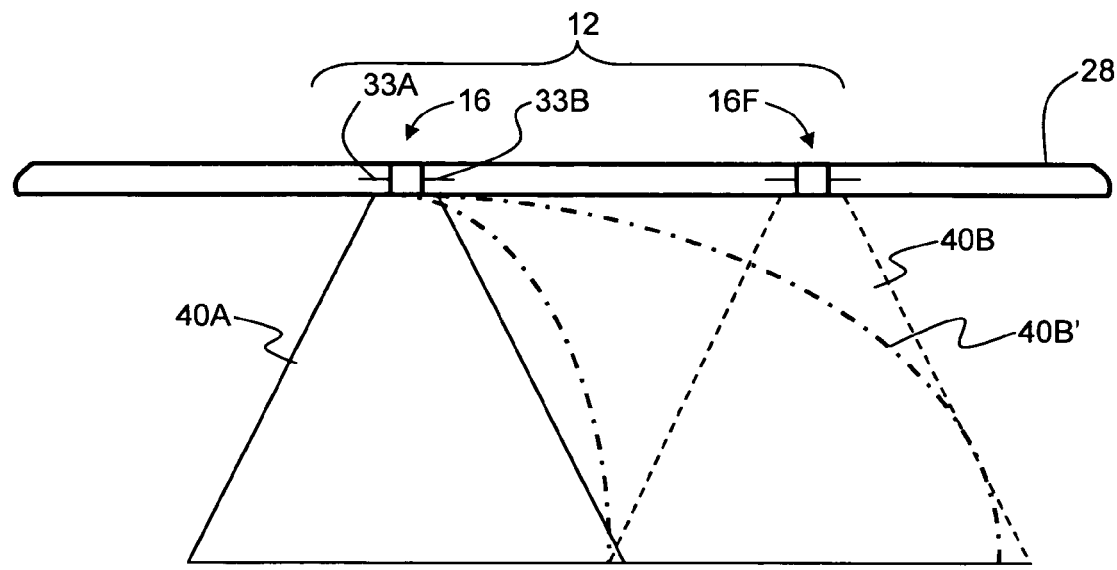
FIG. 10 is similar to FIG. 8 and shows a backup picocell formed by using the transponder adjacent the failed transponder as a backup transponder by operating the 2.4 GHz antenna of the backup transponder at 5.2 GHz to provide picocell coverage at 5.2 GHz for the failed transponder.

FIG. 10 is similar to FIG. 8, with antenna 33B of the backup transponder 16 is fed the $f_A$=5.2 GHz signal originally sent to antenna 33A of failed transponder 16F. This is accomplished, for example, by head-end station 20 detecting a change in signal strength from failed transponder 16F and providing a control signal SC to an adjacent transponder 16 that switches the adjacent transponder from normal mode to backup mode. Head-end station 20 then redirects signals $SD_A$ from the failed transponder to the backup transponder, as described in greater detail below in connection with an example embodiment of a RoF picocellular wireless system according to the present invention.

The directivity of antenna 33B changes from being substantially locally perpendicular to optical fiber cable 28 at its normal operating frequency $f_B$=2.4 GHz to having a significant y-component at frequency $f_A$=5.2 GHz. This is the aforementioned backup operating mode, which results in the formation of a backup picocell 40B' (variable dashed line) that covers (or that covers at least a substantial portion of) picocell associated with failed transponder 16F while it was operable (picocell 40A is not shown in FIG. 10). In an example embodiment, a "substantial portion" is about half or more of the coverage of picocell 40A associated with failed transponder 16F. While in certain cases this may stop the formation of the 2.4 GHz picocell 40B at backup transponder 16, it allows for continuous picocell coverage at $f_B$=5.2 GHz (via backup picocell 40B') which frequency may be providing a service, such as data service, that is deemed more important than the 2.4 GHz service, such as voice service. Note that in certain embodiments of antenna system 32, such as that shown in FIG. 4, the service at frequency $f_B$=2.4 GHz in the backup transponder 16 can continue by using one antenna element 33B for $f_A$=5.2 GHz while continuing to feed the other antenna element 33B in antenna pair 133B with the $f_B$=2.4 GHz frequency. Also, as shown in FIG. 10, the picocell area associated with failed transponder 16F is covered by picocell 40B generated by transponder 16F (which is still operable at 2.4 GHz), and is also at least substantially covered by picocell 40B' from adjacent transponder 16 that provides coverage at 5.2 GHz.

To summarize, if one of the transponders 16 in redundant transponder array 12 fails at $f_A$=5.2 GHz, the $f_B$=2.4 GHz, antenna 33B of the neighboring (backup) transponder 16 is fed the $f_A$=5.2 GHz signal $SD_A$ associated with the failed transponder. The change in directivity of the radiation pattern 42 for the 2.4 GHz antenna 33B provides sufficient radiation power to provide substantial picocell coverage for the failed transponder at $f_A$=5.2 GHz. In an example embodiment of the method, the picocell-to-picocell interference is made minimal by employing a large number N of channels (e.g., N>12) within the 5.2 GHz band.

Figure 11:
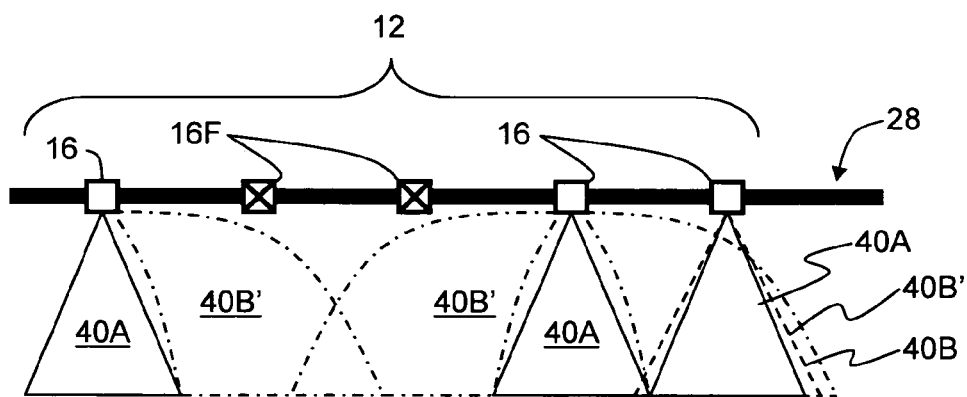
FIG. 11 is a schematic diagram of an optical fiber cable that operably supports the redundant transponder array, illustrating how the redundant transponder array is used to provide backup picocellular coverage in the event that two adjacent transponders fail.

FIG. 11 is a schematic diagram of an example optical fiber cable 28 that operably supports a redundant transponder array 12 having five transponders 16, including two adjacent failed transponders 16F. Redundancy for adjacent failed transponders 16F is provided by the operative transponders 16 on either side of failed transponders 16F. Each of these operative transponders 16 provides a backup picocell 40B' for the adjacent failed transponder 16F via the corresponding 2.4 GHz antenna(s) 33B operated at 5.2 GHz, as described above. Picocells 40B of the failed transponders 16F are omitted for the sake of illustration. Note that the rightmost operative transponder 16 has picocells 40A and 40B that are overlapped by a lobe of backup picocell 40B' formed by the adjacent transponder as used as a backup transponder. As mentioned above, interference between picocells is avoided in an example embodiment by using slightly different channel frequencies or subcarrier frequencies within the particular frequency band (here, the $f_B$=5.2 GHz frequency band).

RoF Picocellular Wireless System with Redundant Transponder Array

Figure 12:
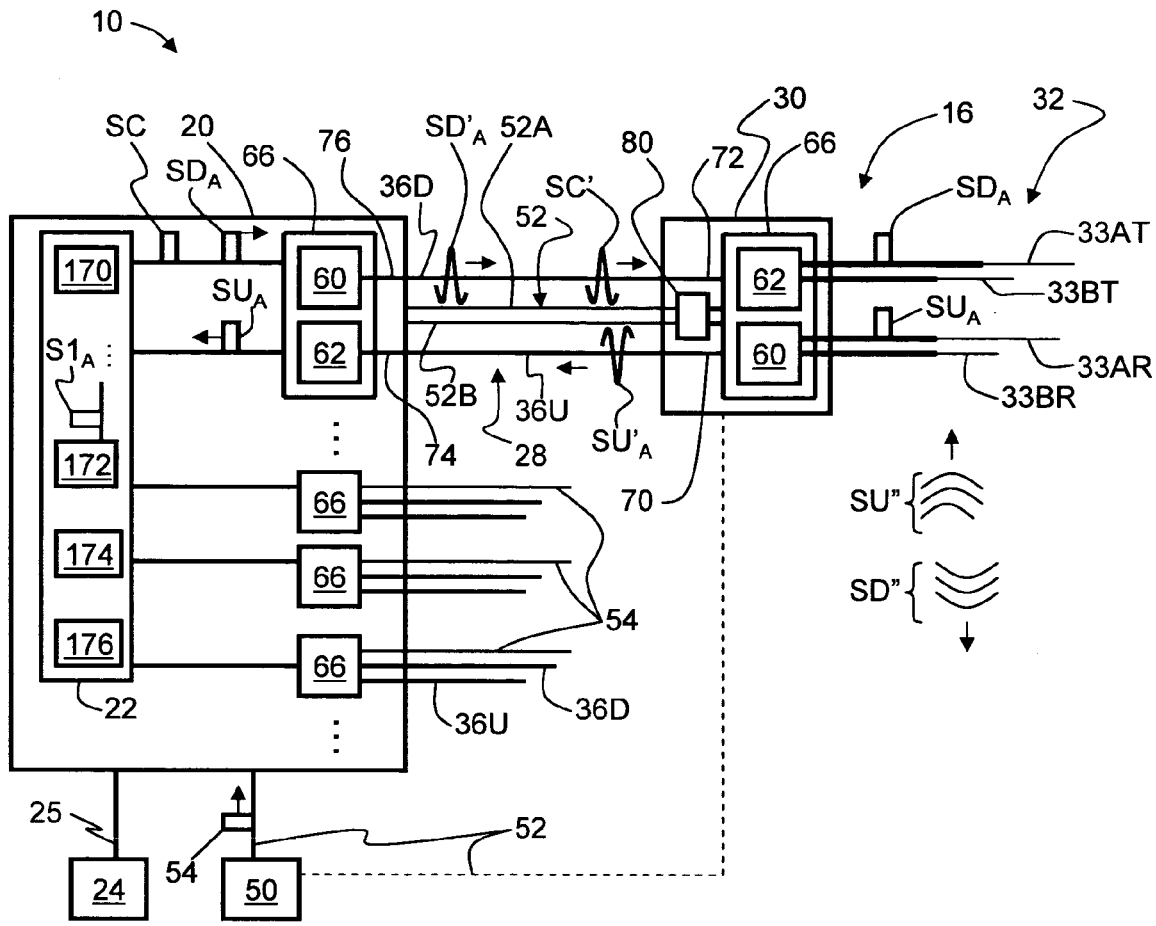
FIG. 12 is a detailed schematic diagram of an example embodiment of the RoF picocellular wireless system of FIG. 1, showing details of an example embodiment of the head-end station adapted to provide transponder redundancy according to the present invention in the RoF picocellular wireless system.

FIG. 12 is a more detailed schematic diagram of the RoF picocellular wireless system 10 of FIG. 1, showing additional details of an example embodiment of head-end station 20. Head-end station 20 includes aforementioned controller 22 that provides RF signals for a particular wireless service or application, such as 2.4 GHz signals for voice service and 5.2 GHz signals for data services. Other signal combinations are also possible, e.g., using 2.4 GHz for data and 5.2 GHz for voice.

In an example embodiment, controller 22 includes a RF signal modulator/demodulator unit 170 for modulating/demodulating RF signals, a digital signal processor 172 for generating digital signals, a central processing unit (CPU) 174 for processing data and otherwise performing logic and computing operations, and a memory unit 176 for storing data. In an example embodiment, controller 22 is adapted to provide a WLAN signal distribution as specified in the IEEE 802.11 standard, i.e., in the frequency range from 2.4 to 2.5 GHz and from 5.0 to 6.0 GHz. In an example embodiment, controller 22 serves as a pass-through unit that merely coordinates distributing electrical RF signals SD and SU from and to outside network 24 or between picocells 40.

Head-end station 20 includes one or more converter pairs 66 each having an E/O converter 60 and an O/E converter 62. Each converter pair 66 is electrically coupled to controller 22 and is also optically coupled to corresponding one or more transponders 16. Each E/O converter 60 in converter pair 66 is optically coupled to an input end 76 of a downlink optical fiber 36D, and each O/E converter 62 is optically coupled to an output end 74 of an uplink optical fiber 36U.

In an example embodiment of the operation of system 10 of FIG. 12, digital signal processor 172 in controller 22 generates a $f_A$=5.2 GHz downlink digital RF signal $S1_A$. This signal is received and modulated by RF signal modulator/demodulator 170 to create a downlink electrical RF signal ("electrical signal") $SD_A$ designed to communicate data to one or more client devices 46 in picocell(s) 40. Electrical signal $SD_A$ is received by one or more E/O converters 60, which converts this electrical signal into a corresponding optical signal $SD'_A$, which is then coupled into the corresponding downlink optical fiber 36D at input end 76. It is noted here that in an example embodiment optical signal $SD'_A$ is tailored to have a given modulation index. Further, in an example embodiment the modulation power of E/O converter 60 is controlled (e.g., by one or more gain-control amplifiers, not shown) in order to vary the transmission power from directive antenna system 32, which is the main parameter that dictates the size of the associated picocell 40A. In an example embodiment, the amount of power provided to directive antenna system 32 is varied to define the size of the associated picocell 40A.

Optical signal $SD'_A$ travels over downlink optical fiber 36D to an output end 72 and is processed as described above in connection with system 10 of FIG. 1 to return an uplink optical signal $SU''_A$. Optical signal $SU''_A$ is received at head-end station 20, e.g., by O/E converter 62 in the converter pair 66 that sent the corresponding downlink optical signal $SD'_A$. O/E converter 62 converts optical signal $SU'_A$ back into electrical signal $SU_A$, which is then processed. Here, in an example embodiment "processed" includes one or more of the following: storing the signal information in memory unit 176; digitally processing or conditioning the signal in controller 22; sending the electrical signal $SU_A$, whether conditioned or unconditioned, on to one or more outside networks 24 via network links 25; and sending the signal to one or more client devices 46 within the same or other picocells 40. In an example embodiment, the processing of signal $SU_A$ includes demodulating this electrical signal in RF signal modulator/demodulator unit 170, and then processing the demodulated signal in digital signal processor 172. Signals of frequency $f_B$ are generated and processed in analogous fashion.

Figure 13:
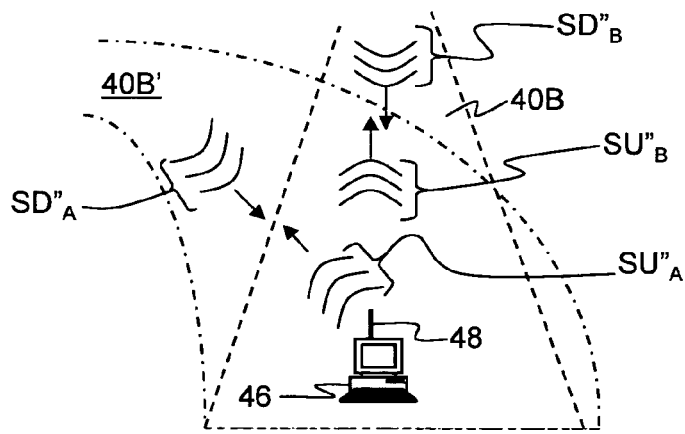
FIG. 13 is a close-up schematic diagram of the backup picocell that provides picocell coverage for a client device in the picocell area of a failed transponder for the RoF picocellular wireless system of FIG. 12.

If one of the transponders 16 in redundant transponder array 12 fails in a manner that prevents the formation of the 5.2 GHz picocell 40A, then controller 22 detects this failure, e.g., by a change in the quality and/or strength of uplink electrical signal $SD_A$ from the failed transponder. FIG. 13 is a close-up schematic diagram of the back-up picocell 40B' providing picocell coverage for a client device in the picocell area of a failed transponder for the RoF picocellular wireless system of FIG. 12. In the event of a transponder failure, controller 22 directs the 5.2 GHz electrical signal $SD_A$ for the failed transponder 16F to an adjacent transponder 16.

Further, in response to detecting a transponder failure, controller 22 generates an electrical control signal SC, which is converted to a corresponding optical control signal SC' (FIG. 3) that travels over downlink optical fiber 36D and is received by photodetector 120 of a transponder 16 adjacent the failed transponder. Photodetector 120 converts optical control signal SC' back into the electrical control signal, as described above. Control signal SC is directed to signal-directing element 128, as described above. However, control signal SC is now adapted to put signal-directing element 128 into the backup operating mode, wherein the 5.2 GHz electrical signal $SD_A$ associated with the adjacent failed transponder 16F is directed by the signal-directing element to the 2.4 GHz transmission antenna 33B of the backup transponder. This causes antenna 33B in directive antenna system 32 of backup transponder 16 to radiate downlink electromagnetic signal $SD''_A$ over backup picocell 40B'. Thus, the adjacent transponder 16 provides transponder redundancy by acting as a backup transponder for the failed transponder 16F. The 2.4 GHz receiving antenna 33B of the backup transponder 16 also receives the 5.2 GHz electromagnetic uplink signals $SU''_A$ from antenna system 48 of client device 46 and converts them to signals $SU_A$, which are communicated to head-end station 20 as described above.

Note that in the example embodiment of system 10 of FIGS. 12 and 13, failed transponder 16F may still be able to send and receive downlink and uplink signals at frequency $f_B$=2.4 GHz via its antenna 33B. Note also that in an example embodiment as mentioned above, adjacent transponders operate at slightly different frequencies or subcarriers within the 5.2 GHz band so that signal-directing element 128 can discern between the different 5.2 GHz band signals associated with the different transponders.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of providing transponder redundancy in a transponder array of two or more transponders operably supported by an optical fiber cable, comprising:

providing at least one transponder with first and second antennas adapted to operate at respective first and second normal operating frequencies so as to form corresponding first and second substantially co-located picocells;

forming at least the first picocell at the at least one transponder by providing the at least one transponder with at least a first signal having the first frequency; and in the event that one transponder fails to form its corresponding first picocell, forming a backup picocell that covers at least a substantial portion of the failed transponder's first picocell by providing the second antenna of an adjacent transponder to the failed transponder with the first signal having the first frequency of the failed transponder.

2. The method of claim 1, wherein the first frequency is about 5.2 GHz and the second frequency is about 2.4 GHz.

3. The method of claim 2, including providing data service at the first frequency and voice service at the second frequency.

4. The method of claim 1, wherein the first antenna provides a first service, the second antenna provides a second service, and including terminating the second service of the first transponder in order to maintain the first service of the failed second transponder.

5. The method of claim 1, including:

sending first and second optical signals to the at least one transponder over a RoF optical fiber cable coupled to a head-end station; and converting the first and second optical signals to first and second electrical signals at the at least one transponder.

6. The method of claim 1, including:

adapting the at least one transponder to operate in either a normal operating mode or a backup operating mode; and providing the adjacent transponder with a control signal that changes the adjacent transponder's operating mode.

7. A redundant transponder array for a Radio-over-Fiber (RoF) optical fiber cable, comprising:

two or more transponders operably supported by the radio-over-fiber (RoF) optical fiber cable;

wherein at least one transponder has first and second antennas having respective first and second normal operating frequencies and that form corresponding first and second substantially co-located picocells in response to respective first and second signals having the first and second frequencies, respectively; and wherein the second antenna is adapted to form a backup picocell that covers at least a substantial portion of the first picocell of the adjacent transponder when fed the signal of the first frequency.

8. The system of claim 7, wherein the first and second antennas have respective normal operating frequencies in a 5.2 GHz band and a 2.4 GHz band.

9. The system of claim 8, wherein at least one of the first and second antennas is a dipole antenna.

10. The system of claim 7, including uplink and downlink optical fibers optically coupled to the at least one transponder.

11. A RoF picocellular wireless system according to claim 7, comprising:

a head-end station adapted to provide first and second downlink signals for first and second service applications at the first and second frequencies, respectively;

a RoF optical fiber cable having the redundant transponder array of claim 7, the optical fiber cable being optically coupled to the head-end station and adapted to provide the first and second downlink signals to the first and second antennas, respectively, of the at least one transponder; and wherein the head-end station is adapted to detect a failed transponder and feed the first downlink signal being sent to the failed transponder to the second antenna of the adjacent transponder.

12. The system of claim 11, wherein the at least one transponder is switchable between a normal operating mode and a backup operating mode via a control signal.

13. The system of claim 12, wherein the head-end station is adapted to provide the control signal to the at least one transponder.

14. A radio-over-fiber (RoF) optical fiber cable system with transponder redundancy, comprising:

two or more transponders adapted to convert RF optical signals to RF electrical signals and vice versa, wherein at least two transponders include first and second antennas adapted to form first and second substantially co-located picocells in response to first and second downlink RF signals at first and second frequencies, respectively, wherein the first and second picocells of adjacent transponders are substantially non-interfering;

corresponding two or more uplink and downlink optical fiber pairs, with each pair optically coupled to a corresponding transponder; and wherein the second antenna is adapted to form a backup picocell that substantially overlaps the first picocell of the adjacent transponder when provided with the first downlink RF signal at first frequency of said adjacent transponder.

15. The system of claim 14, wherein at least one transponder is switchable between a normal operating mode and a backup operating mode via a control signal, and wherein the normal operating mode forms the substantially co-located first and second picocells, and wherein the backup mode forms the backup picocell.

16. The system of claim 14, wherein the optical fiber cable has a length and wherein the first and second antennas include wire antennas arranged along the optical fiber cable length.

17. The system of claim 14, further including a head-end station optically coupled to the downlink and uplink optical fibers of the optical fiber cable and adapted to generate first and second downlink optical RF signals at the respective first and second frequencies to be transmitted over the downlink optical fibers to one or more of the transponders, and to receive and process first and second uplink RE optical signals of the respective first and second frequencies from one or more of the transponders.

18. The system of claim 17:

wherein at least one transponder is switchable between a normal operating mode and a backup operating mode via a control signal, and wherein the normal operating mode forms the substantially co-located first and second picocells, and wherein the backup mode forms the backup picocell; and wherein the head-end station is adapted to:

i) detect a failed transponder;

ii) identify a transponder to serve as a backup transponder iii) send a control signal to the backup transponder to change its operating state from the normal operating mode to the backup operating mode; and iv) redirect downlink RF signals originally being sent to the failed transponder to the backup transponder to form the backup picocell.

19. The system of claim 14, wherein the head-end station is adapted to provide a first service via the first downlink signal and a second service via the second downlink signal.

20. The system of claim 19, wherein the first service is data service.

* * * * *